W. D. PAXTON.
AUTOMOBILE AND TRUCK.
APPLICATION FILED MAR. 1, 1916.

1,242,588.

Patented Oct. 9, 1917.

Inventor:
W D Paxton
by Frederick L Fishback
Attorney.

UNITED STATES PATENT OFFICE.

WILLIAM D. PAXTON, OF LAPORTE, INDIANA.

AUTOMOBILE AND TRUCK.

1,242,588.  Specification of Letters Patent.  Patented Oct. 9, 1917.

Application filed March 1, 1916. Serial No. 81,356.

*To all whom it may concern:*

Be it known that I, WILLIAM D. PAXTON, a citizen of the United States, resident of Laporte, in the county of Laporte and State of Indiana, have invented a new and useful Invention or an Improvement in Automobiles and Trucks, of which the following is a specification.

My invention relates to the transmission of power from the engine shafts to the wheel shafts of motor driven vehicles.

The object of my invention is to produce a shiftable gear connection between the engine shafts of motor-driven vehicles by which the driven wheels may be propelled forward or backward. Another object thereof is to produce a transmission or coupling connection between the engine shaft and wheel shaft which permits the wheel shaft to be turned on a central pivot in steering the vehicle, and a still further object of my invention is to produce a more simple, cheap and efficient device of the character described than has heretofore been attained.

To these ends, and for other purposes which will hereinafter appear, my invention includes the combination and arrangement of component parts to be hereinafter described and more particularly pointed out in the claims.

In the accompanying drawings, in which like reference characters indicate similar parts, Figure 1 is a vertical sectional view of my transmission gear;

Figure 1:
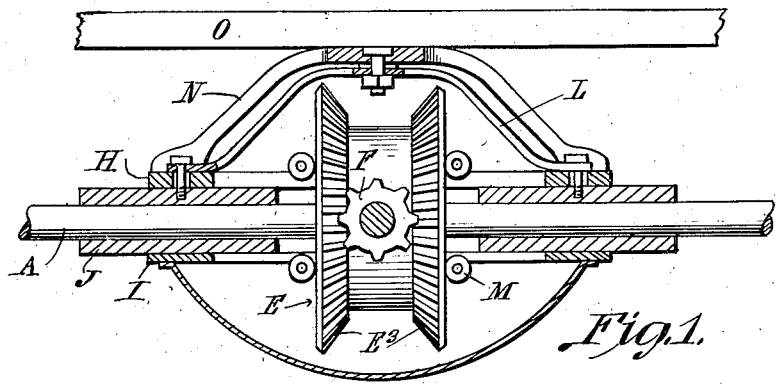
Figure 3:
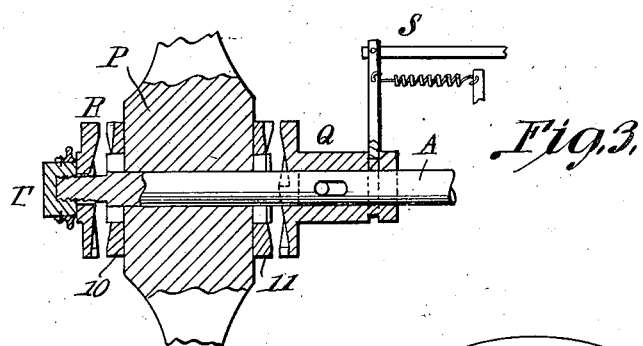
Fig. 3 is a sectional view of one of the wheel clutches.
Figure 2:
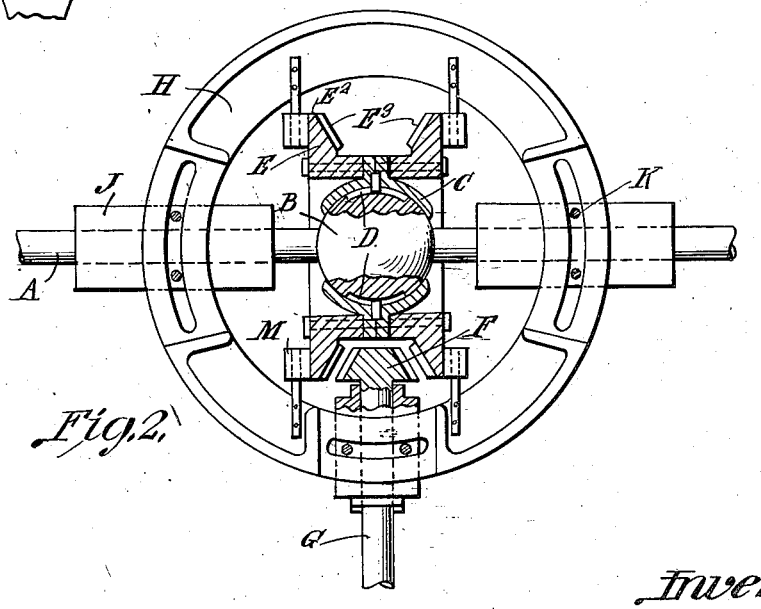
Fig. 2 is a horizontal sectional view of the same.

Referring now to the drawings, A designates the cross shaft or axle on the outer ends of which the wheels of a vehicle are mounted as hereinafter described.

Intermediate of its ends, said shaft is formed into an enlarged ball B movably carried in the sectional cup-shaped sockets C which are rigidly carried in the gear wheel E.

For the purpose of permitting a limited universal movement of the ball B in said sockets, a plurality of slots I are cut therein diametrically opposite to each other into which the pins D carried in the sockets C project.

As shown in the drawings, said gear E comprises the annular rim having the outwardly-extending flanges $E^2$ on each side, the inner faces of which are provided with beveled teeth $E^3$ to engage the gear F on the end of the engine shaft G.

The axle shaft A and gearing thus described is carried in the horizontally disposed annular plates H and I on which the body of the vehicle is supported by the brackets N on which the cross beam O is attached.

As further shown in the drawings, the axle A is carried in the sleeves J on each side of the gear wheel E which sleeves are movably attached to the upper plate H by the pins K supported by the stirrup L, which pins pass through slots in said upper plate, which construction will obviously permit the axle shaft A and gear E to turn pivotally in steering a vehicle, and the gear wheel E will be kept in correct alinement by the plurality of roller bearings M carried on the pins attached to the plate H.

The beveled gear E and axle shaft A attached thereto is driven forward or backward by the pinion F carried on the end of the shaft G between the toothed faces of the flanges thereon, and may be shifted by suitable means into engagement with either side for driving forward or backward. The shaft G is carried in a sleeve or bearing which is pivotally carried on the plates H and I.

At the outer ends of the axles A, the wheels P are carried and are provided with oppositely arranged clutch members 10 and 11 on the outer and inner ends of the hubs. The outer end of the axle is squared at 12 to carry the coöperating clutch member 13 which is normally held in engagement with the outer hub clutch 10 to drive the wheels forward when the axle is driven forward. When the movement of the axle is reversed, the sliding clutch member Q is disengaged by the lever S.

I claim:

1. A driving gear for motor vehicles, comprising a cross axle, an enlarged spherical portion thereon intermediate of its ends, a transversely disposed gear wheel carried thereon having peripheral flanges provided with inwardly extending beveled teeth, cup-shaped sockets rigidly attached to the inner perimeter of the rim of said gear wheel and movably connected with the spherical portion of the axle to permit a pivotal movement of the axle, and a shiftable pinion for engaging the opposite faces of the toothed flanges on the drive wheel to drive the axle in opposite directions.

2. A driving gear for motor vehicles comprising an axle, an enlarged spherical portion thereon intermediate of its ends, a transversely disposed gear wheel carried thereon having annular peripheral flanges provided with inwardly extending beveled teeth, cup-shaped sockets rigidly attached to the rim of said gear wheel and movably attached to the spherical portion of the axle, a pair of horizontally disposed annular plates having sliding bearings for said axle, means for holding said gear wheel in proper alinement, and a beveled pinion for alternately engaging the gear teeth on said gear wheel to drive the axle forward or backward.

WILLIAM D. PAXTON.

Witnesses:
M. E. LEHTER,
E. R. ARMSTRONG.